United States Patent [19]

Balaska et al.

[11] Patent Number: 4,485,457

[45] Date of Patent: Nov. 27, 1984

[54] MEMORY SYSTEM INCLUDING RAM AND PAGE SWITCHABLE ROM

[75] Inventors: Richard K. Balaska, Norwalk, Conn.; Robert L. Hunter, New York, N.Y.; Scott S. Robinson, Jr., Stamford, Conn.

[73] Assignee: CBS Inc., New York, N.Y.

[21] Appl. No.: 499,128

[22] Filed: May 31, 1983

[51] Int. Cl.³ ............................ G06F 9/00; G06F 9/30
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,028,675 | 6/1977 | Frankenberg | 364/900 |
| 4,261,041 | 4/1981 | Starr | 364/900 |
| 4,368,515 | 1/1983 | Nielson | 364/200 |

*Primary Examiner*—Gareth D. Shaw
*Assistant Examiner*—John G. Mills
*Attorney, Agent, or Firm*—Spencer E. Olson

[57] ABSTRACT

A memory system for use in a video game system or the like that has a limited number of signal lines for communicating address signals and a data bus, includes random access memory (RAM) to augment that contained in the game console in addition to plural segments of read only memory (ROM). A first decoding circuit is coupled to the data bus and to the signal lines that communicate address signals to the ROM segments, and in response to detection of a predetermined address and a predetermined status of selected data lines produces a signal that selects one of the plurality of ROM segments of memory locations. A second decoding circuit is coupled to a selected group of the address signal lines, and also to a segment of the memory unit set aside for random access memory (RAM) to which the others of the address signal lines are also coupled. When a predetermined address is communicated, the first decoding circuit is inhibited and the second decoding circuit couples an instruction signal to the RAM segment to either write data to or read data from a memory location addressed by the others of the address lines.

8 Claims, 4 Drawing Figures

MEMORY SYSTEM INCLUDING RAM AND PAGE SWITCHABLE ROM

BACKGROUND OF THE INVENTION

This invention relates generally to digital systems that use a fixed number of signal lines for communicating addresses to a digital memory element having a plurality of addressable memory locations, and more particularly to an apparatus and method that enhances the performance of existing game or computer systems which, because of unalterable prior design limitations, are limited in the amount of directly addressable ROM and RAM memory.

The television video game industry has for some time been producing video games for home use that incorporate microprocessors to maintain and control game play operation. The currently most popular form of such a video game is the Atari Model CX-2600 Video Computer System (VCS, a trademark of Atari, Inc.) which includes a console unit containing the microprocessor and other electronic circuitry that receives player input information from player manipulated elements (i.e., paddles, joysticks, and the like) and generates electronic signals that are used to drive a TV display unit. The game console is provided with a receptacle that removably receives a relatively inexpensive portable cartridge. The cartridge contains an electronic microcircuit, including a form of read only memory (ROM) that stores the program of the video game to be played. With a plurality of such interchangeable cartridges, the consumer can use the video game console to execute any one of a large selection of video games.

A potential problem with any digital system, one which has developed in the video game industry, and specifically in the case of the Atari VCS, resides in the limited number of individually addressable memory locations in the game cartridge which can be uniquely addressed by the microprocessor unit. This limit is related to the number of signal lines used to make up the address bus that conducts address signals to the cartridge memory; since the address bus of the VCS consists of thirteen signal lines, one being reserved for external memory selection, i.e., chip select, the system can handle a maximum of only $2^{12}$ or 4,096 uniquely addressable ROM memory locations in the cartridge for containing the program instructions used by the microprocessor to define the video game. As the video game market has matured, game designers who have grown accustomed to the Atari VCS and other game systems are now developing games that are more sophisticated in that they have involved game play and enhanced graphics and, as a consequence, require a larger ROM memory than can be directly addressed by the limited number of address signal lines available at the game console/cartridge connector.

A system for expanding the number of ROM memory locations contained in the game cartridge of a video game system without requiring additional address lines is described in U.S. Pat. No. 4,368,515, and includes a supplemental address decode logic coupled between the address bus and thee memory element. The address decode logic monitors the address signals communicated on the address bus and, in response to detection of a preselected address generates a selection signal. The selection signal is applied to the address circuit of the ROM, together with the address bus, the selection signal being terminated in response to the detection of a second preselected address. Thus, a two-bank system having an address bus limited to N signal lines for addressing a maximum of $2^N$ memory locations is now capable of addressing $(2^{N+1}-4)$ memory locations. The system and the program ROM with which it operates is incorporated in a single microcircuit chip that is mounted within the video game cartridge. By supplementing thee program ROM, existing video game apparatus can be programmed for more complex video games, existing video games can be improved to operate faster, and cartridges can be made to contain a greater number of individual games.

While the system described in U.S. Pat. No. 4,368,515 partially overcomes the limitations of the VCS design, it does not overcome the limitation inherent in the method by which it must put graphics on the TV display. In the VCS the microprocessor must draw each frame of the picture on the television screen line-by-line; consequently, only during the intervals when no changes are being made between subsequent lines of the picture that is on the screen, that is, primarily during the vertical blanking interval, is the microprocessor free to determine the changes which must occur in the next succeeding picture on the display and to do any other housekeeping chores that may be necessary. In other words, except during the vertical blanking interval the microprocessor works almost exclusively in just putting the graphic information on the television screen. This being the case, it is useful to be able to calculate in advance and store as much information as possible in temporary memory locations (i.e., random access memory) during the vertical blanking interval.

While the VCS provides for a limited amount of RAM in the console, specifically, 128 bytes, as video games have become more sophisticated the need to temporarily store greater amounts of information either resulting from mathematical calculations or which must be rapidly displayed as graphics, has limited the sophistication of the games that can be designed for play on a VCS console. Accordingly, it is desirable to incorporate additional RAM into the game system, and also increase the number of addressable memory locations in ROM, both without changing the number of address signal lines in the connector of the current VCS and, since field modification of the millions of game consoles already in use would not be feasible, the additional RAM must be easily added by the consumer and preferably added in the cartridge.

SUMMARY OF THE INVENTION

The present invention provides, in the cartridge of a video game system having a limited number of signal lines for addressing the cartridge, random access memory (RAM) to augment that contained in the console of the game system, a larger number of ROM memory locations than are contained in prior game cartridges, and the logic required to tie the cartridge RAM and the console RAM into a unified system, without requiring control or additional address signal lines. To overcome the limitation that only 4K bytes of memory space can be addressed, the additional RAM and ROM contained in the cartridge are so interconnected that a number of selected microprocessor addresses are allocated for RAM and the remaining addresses allocated for ROM, and the additional ROM is achieved by paging or bank switching.

According to the invention, a portion of the memory locations contained in the cartridge is set aside and used for RAM and the rest of the memory locations is used for ROM. In a preferred embodiment, 256 memory locations, 8 bits wide, are set aside for use as RAM memory; because the microprocessor must both read and write to these locations, and no control signals are available from the READ/WRITE line of the VCS, it is convenient to utilize 256 addresses for writing information to this portion of the memory and another 256 addresses for reading information from this memory location. Thus, twice as many addresses as the number of memory locations are required to provide the augmented RAM in the cartridge, which allocation must be subtracted from the total number of addresses that would otherwise be available at any given instant if the cartridge contained only ROM. In the present example, then, 512 addresses are set aside for RAM utilization, leaving only 3,584 addresses for accessing ROM space.

To address more memory locations than the remaining 3,584 words that the twelve address lines can handle, paging is utilized to address separate segments or pages of memory, each of which may contain about 3,584 8-bit words. In a preferred embodiment, a 10.5K byte memory is segmented into three 3.5K byte segments or pages which are separately addressed with logic circuitry which utilizes a combination of address and data lines. Thus, while at any instant of time, 3,584 bytes of ROM and 256 bytes of RAM are accessible to the microprocessor, the paging technique (also known as bank switching) expands the number of ROM memory locations contained in the game cartridge to about 10.5K bytes.

The preferred embodiment of the invention, including the expanded number of addressable ROM locations, the RAM needed to augment the RAM provided in the console of the VCS system, and the logic required to effect paging and to tie the cartridge RAM and the console RAM into a unified system, is incorporated in a single microcircuit chip that is mounted within the video game cartridge. By supplementing the program ROM contained in video game cartridges, and augmenting the RAM provided in the VCS console unit, existing video game apparatus can be programmed for more complex video games than were possible with the VCS system, even as supplemented according to the teaching of U.S. Pat. No. 4,368,515.

Other objects, features and advantages of the invention will become apparent, and its construction and operation better understood, from the following description when read in conjunction with the accompanying drawings.

DETAILED DESCRIPTION OF THE INVENTION

Figure 1:
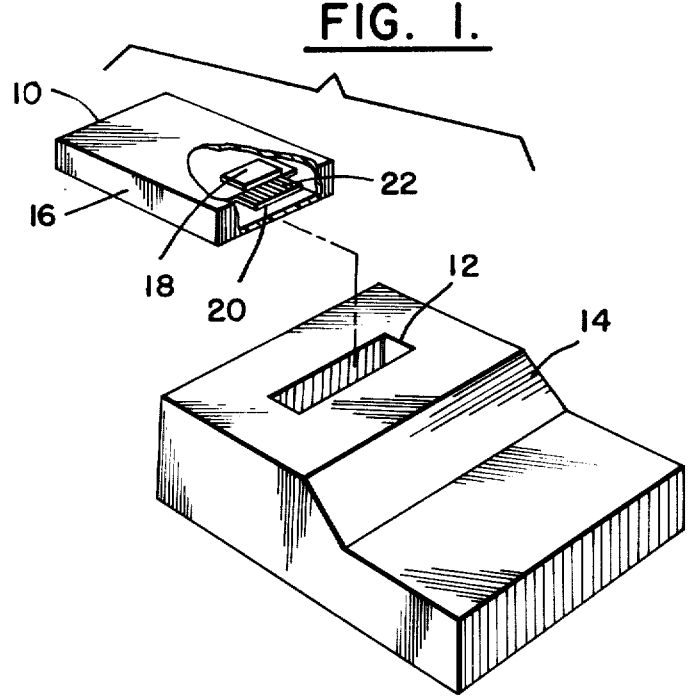
FIG. 1 is a perspective view of a game cartridge containing a microcircuit constructed in accordance with the present invention and a game console for receiving the cartridge.

FIG. 1 is a perspective view of the currently popular VCS video game system that includes a cartridge 10 designed to be removably inserted in a socket 12 of a game console 14. The cartridge is portable and contains a circuit board 16 which carries an electronic microcircuit 18. Circuit board 16 includes a connector portion 20 having a number of printed circuit leads 22 thereon that establish electrical connection between the microcircuit 18 carried by the circuit board 16 and a connector contained within console 14.

Figure 2:
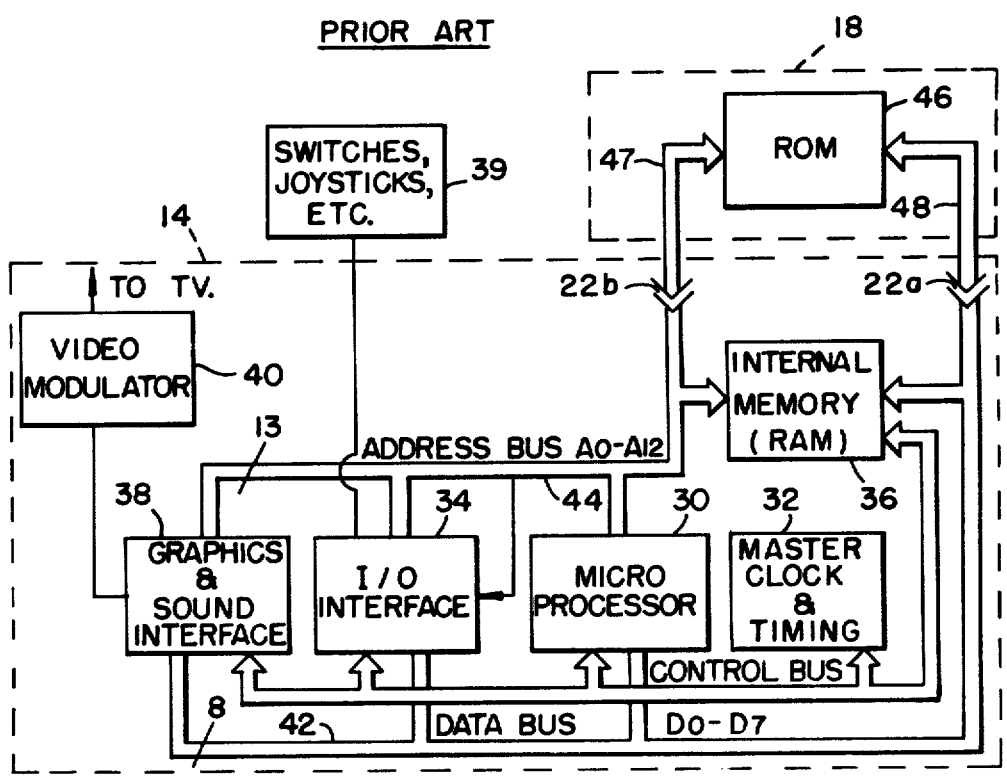
FIG. 2 is a block diagram of a prior art game console and cartridge.

Referring to FIG. 2, the electronics housed within console 14 is schematically illustrated as including a microprocessor 30 which under control of master clock and timing circuitry 32 functions to maintain game play control over game electronics including an input/output interface 34, internal random access memory (RAM) 36, graphics and sound generation circuits 38, manually actuable controls 39, such as joysticks and switches, and a video modulator 40, the output of which is applied to a television set on which the graphics of the video game are displayed. Communication between microprocessor 30 and the game electronics is established via a conventional 8-bit data bus 42 and a 13-bit address bus 44. The microcircuit 18 housed within cartridge 10 includes a read only memory (ROM) 46 which contains the program instructions used to direct operation of microprocessor 30. Data output lines 48 of ROM 46 are electrically connected to data bus 42 by connector leads 22a on connector 20. Similarly, 13-bit address bus 44 is electrically coupled to the program ROM 46 via thirteen connector leads 22b to the address bus 47 of ROM 46.

In operation, microprocessor 30 obtains its instructions from the cartridge ROM memory 46. In a typical instruction cycle, microprocessor 30 sends an address location to the ROM 46, and the data in the specific addressed ROM memory location is accessed using internal decoding circuitry within the ROM which puts the data in a ready state for transmittal via data bus 42 to microprocessor 30. A short period of time later, the data line between ROM 46 and microprocessor 30 is opened and the information on the data bus is fed to the microprocessor for further operation; this information may be either data or an instruction.

To store information into a RAM location, microprocessor 30 first sends an address signal to the RAM 36, which information enables a specific location within the RAM for receipt of data. Once the location has been specified, data is transmitted along data bus 42 and fed directly into the enabled RAM location. The information is then held in storage until new data is read into this location or power to the circuit is shut off. The ability of microprocessor 30 to address ROM and RAM locations is limited by the number of address lines used in the design architecture of console 14; as has been noted, the VCS has thirteen address lines, one of which is reversed for external memory selection, which allows $2^{12}$ or 4,096 memory locations to be accessed and allows for transmittal of information 8 bits wide at a time. In keeping with conventional notation, when the chip select line is active (represented in the present system by a binary "1") an address (which is shown in hexadecimal notation) is preceded by the numeral "1". Thus, unless modified as taught by U.S. Pat. No. 4,368,515, for example, the maximum cartridge memory usable by the system has 4,096 locations each of which is eight binary bits wide for a total memory capacity of 32,768 bits. For RAM access, the internal architecture provides only 128 locations, 8 bits wide, for storage and retrieval of 1,024 bits of information.

Figure 3:
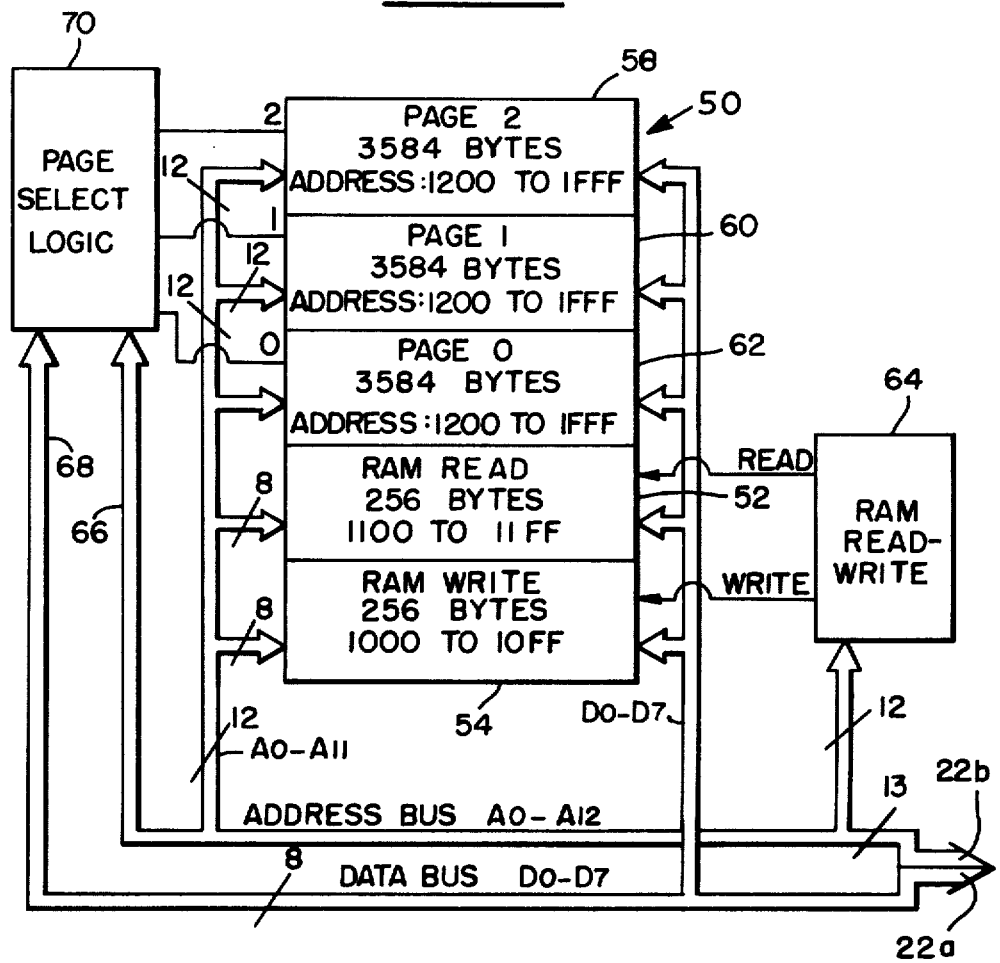
FIG. 3 is a general block diagram of a preferred embodiment of the invention.

FIG. 3 is a general block diagram of the RAM and ROM architecture according to the invention for enhancing the ROM and RAM capabilities of the video game system shown in FIG. 2. In the illustrated embodiment, a memory element 50 having 11K bytes of memory is divided into five segments, three of which each have 3,584 bytes, and the other two of which each have 256 bytes.

Unlike a normal cartridge where microprocessor 30 could only read data from these memory locations, according to the present invention the 256 byte segments 52 and 54 are set aside and used for RAM and the other three segments, numbered 58, 60 and 62 and labeled Page 2, Page 1 and Page 0, respectively, are used to increase the program ROM capacity of the video game cartridge. In the normal cartridge, the microprocessor could only read data from the memory locations on the memory element, whereas in the system of FIG. 3 (a preferred implementation of which will be described presently), depending upon the address used, the microprocessor can either read data from memory locations or write data to memory locations in the segments set aside for RAM, and can also read data from a selected page of ROM. The code for accessing the RAM segments 52 and 54 is determined by RAM Read-Write logic circuitry 64 that is operative responsively to address information coupled from the microprocessor 30 to address bus 66 which, in turn, is coupled via connector leads 22b to address bus 44 in the console. The code for accessing a given page of ROM is determined by page select logic circuitry 70 that is operative responsively to a combination of address and data information from the microprocessor.

As previously noted, 256 memory locations of memory element 50, each eight bits wide, are set aside for RAM. A convenient way of allowing the microprocessor to both read from and write to these locations is to utilize the 256 addresses of segment 54, designated a hexadecimal notation as 1000 through 10FF, for writing information, and another 256 addresses of segment 52, designated 1100 through 12FF in hexadecimal notation, for reading information from these locations. Thus, the RAM requires twice as many addresses as there are memory locations, this allocation being subtracted from the total memory available to the microprocessor at any given time. In the present embodiment, then, 512 addresses are set aside for RAM utilization, leaving 3,584 addresses for read only memory (assuming a normal 4,096 byte memory element) at any time. For convenience in coding, each of segments 58, 60 and 62 allocated for ROM has 3,584 memory locations and all have the same addresses, namely, 1200 through 1FFF in hexadecimal notation. There is no particular significance to the indicated allocation of available memory locations between RAM and ROM, and for other applications greater or lesser amounts of RAM can be traded for ROM space.

It will have been noted that the 512 RAM addresses are not duplicated in any of the ROM stages, and thus are always available regardless of which ROM page is selected. The remaining addresses to fill up the 4K of memory are in the ROM portion, each page of which has the identical set of addresses; thus, for example, if the microprocessor decides to read an address in Page 0, and if Page 0 is at the time active (by virtue of the application via logic 70 of a chip select (CS) signal from thee microprocessor) and thus amenable to accepting that specific address, the information at that location is read out over data bus 68 to the microprocessor. If, instead, Page 1 were active, the same address on address bus 66 would read the information at that address in Page 1. To repeat, each page of ROM is a duplicate of the others in terms of the addresses that are available; the pages differ, however, in the information stored in them.

Figure 4:
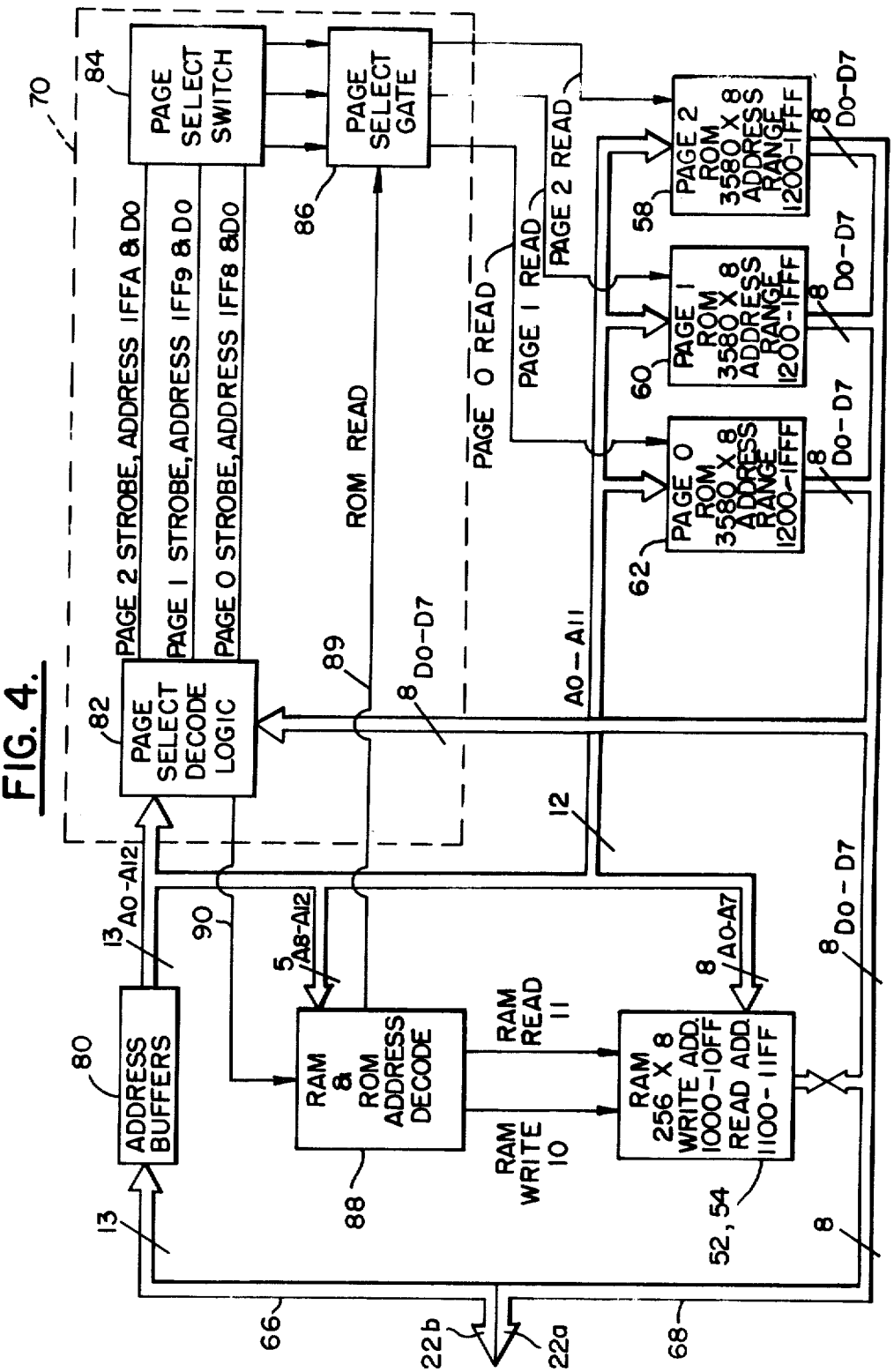
FIG. 4 is a complete block diagram of a preferred implementation of the system shown in FIG. 3.

Referring now to FIG. 4, where like elements are given thee same numeral designations as those used in FIG. 3, there is illustrated a detailed block diagram of the system shown in FIG. 3. Although for the sake of simplicity only three pages of ROM are shown, in practice, any combination of two to N pages (where N has practical finite upper limit) are possible with the described page selection technique. The address and data lines from the VCS console are coupled via connectors 22b and 22a, respectively, to address bus 66 and data bus 68, respectively. The indicated thirteen address lines on address bus 66 comprise the usual twelve address lines A0 through A11 plus a line A12 which is reserved for a chip select (CS) line. The address lines are coupled to respective address buffers 80 and from there twelve lines proceed directly to the ROM pages 58, 60 and 62, each of which has an address decode circuit and contains 3,581 bytes of usable address space (three of the 3,584 bytes otherwise available being wasted for the paging instruction). For compatibility with the VCS system, twelve address lines, labeled A0 through A11 are coupled to the address circuit of each of the ROM pages.

Address lines A0 through A12, and data lines A0 through A7 are connected to page select decode logic 82, the page select decode logic 82 being responsive to the combination of a particular address and predetermined data information. In the present embodiment, the logic is responsive to the data line D0 being in a high state (i.e., the signal on data line D0 is a binary "1") and the other data lines inactive. To select Page 0, the microprocessor accesses the hexadecimal address 1FF8 with data line D0 in a high state, causing page select decode logic 82 to generate a strobe signal on one of its three output strobe lines which is coupled to a corresponding input of a page select switch 84. Page select switch 84 retains the state induced by the most recent strobe, the state of switch 84 determining which of the three pages or banks is in current use. The output of switch 84 is connected to the input of a page select gate 86. If enabled by a "ROM READ" signal from RAM and ROM ADDRESS DECODE 88 (to be described), page select gate 86 couples a select signal to the address circuit of ROM Page 0 where it combines with the twelve address lines A0 through A11 to become a 13th address line for uniquely addressing Page 0. Subsequent accesses to the ROM will reference Page 0 until another page is selected. In similar fashion, when hexadecimal address 1FF9 and data line D0 are both in a high state, and a "ROM READ" signal is applied to gate 86, the gate couples a select signal to the address circuit of ROM Page 1 where it combines with the twelve address lines A0 through A11 to become a 13th address for uniquely addressing Page 1. ROM Page 2 is similarly enabled by hexadecimal address 1FFA and D0 both being in a high state. Thus, the select signals generated by the page select logic effectively divides the memory locations of the ROM into three identifiable segments 58, 60 and 62, all of which are addressable by the address signals that are communicated on the address signal lines, but only one of which is selected and enabled at a time depending on which one is receiving a "READ" signal. It should be understood that these three combinations of addresses and data information were arbitrarily selected and that other combinations can be used if desired.

While it is possible to achieve page switching using only the address lines, that is, without information from one or more data lines, the circuitry would be subject to potential timing errors. Since the address and data signals do not reach page select logic 82 at the same time, the use of a combination of address and data information allows the address signal to stabilize before being combined with the later-arriving data signals on one or more data lines to trigger the page selection. The combination of address and data information for page selection provides higher reliability and stability in a practical application of the system. Although the embodiment illustrated in FIG. 4 utilizes only one of the eight available lines in data bus 68 (namely, D0), and while this configuration provides acceptable performance in the video game environment, it is within the contemplation of the invention to couple two or more, up to all eight of the lines of data bus 68 (i.e., D0 through D7) to page select logic 82 to thereby significantly increase the available number of combinations of address and data information for enabling a desired page of ROM and to maximize the reliability and stability of the system.

The internal RAM of the console of the video game system is augmented by setting aside a selected number of memory locations otherwise used for ROM, in the present embodiment, 256 bytes contained in the segments 52,54. To allow the microprocessor to both read and write to these memory locations, the thirteen address lines from address buffers 80, namely, lines A0 through A12, are coupled as follows: lines A8 through A12 are connected to the RAM and ROM ADDRESS DECODE logic circuit 88 and lines A0 through A7 are connected to the address circuits of the RAM memory 52,54. The status of lines A8 through A12 determines whether the RAM is enabled and whether a Read or Write is required. When the information on lines A8-A12 is 10 Hex, a signal is sent to RAM memory 52,54 such that the RAM is enabled for writing data information to the memory locations. When the information on lines A8-A12 is 11 Hex, a signal is sent which enables the RAM for reading data from the memory locations. The status of address lines A0 through A7 selects the specific memory location within the 256 bytes of RAM.

The RAM and ROM ADDRESS DECODE circuitry 88 further uses addresses A8 through A12 to select between RAM and ROM access. If A8 through A12 is either 10 Hex or 11 Hex the circuit enables RAM 52, 54 and inhibits page select gate 86 via line 89. If A8 through A12 is 12 Hex through 1F Hex, decode circuitry 88 inhibits the RAM and enables page select gate 86. It will be understood that the page select gate will not change ROM pages unless it also receives an appropriate signal from page select switch 84.

As was previously suggested, the described configuration can be modified to have greater or lesser amounts of RAM capacity as a tradeoff with ROM. For example, it is possible to set aside 512 bytes for RAM, for which 1,024 address lines would have to be dedicated, and use the remaining 3K of memory space for ROM. This modified configuration would require somewhat different balancing of the address lines into the RAM space between those used for direct addresses and those used to trigger Read and Write control; in particular, address lines A0 through A8 would be required for direct addressing, and address lines A9 through A12 would be used for Read/Write select.

When the invention is used to expand the cartridge-contained ROM of a video game system, and to provide in the cartridge additional RAM to augment the RAM contained in the console of the game system, the described circuitry is fabricated as a single microcircuit chip. Thus, for example, the ROM array divided into pages 58, 60, and 62, the RAM array 52, 54, address buffers 80, page select decode logic 82 and associated switch 84 and gate 86, and RAM and ROM address decode 88 are preferably fabricated as a single integrated circuit chip and packaged in a conventional dual-in-line package (DIP). The package is configured to be similar to the 8-bit X 4K memory package (32K bits) presently carried by existing cartridges for the VCS. Thus, no changes are needed in the cartridge 10 (FIG. 1) in order to convert a present 32K system to an 88K (or larger) system.

It will now be evident that the invention greatly increases the number of ROM locations that can be addressed by a digital system having an address bus limited to N individual signal lines, and at the same time provides in such a system additional random access memory to augment the RAM of the digital system. The increase in memory space for ROM utilization and the augmented RAM is achieved without modification of the game system, thereby providing a substantial increase in the amount and type of available memory space at very little cost. Although a preferred embodiment of the invention has been shown and described by way of example, it will be obvious that other adaptations and modifications can be made without departing from the true spirit and scope of the invention.

We claim:

1. For use in a video game system or the like including a game address bus having a limited number of signal lines for conducting address signals, a control bus, and a game data bus, an integratable memory system comprising:
    an address bus connectable to the game address bus of the game system for conducting address signals;
    a data bus connectable to the game data bus of the game system for conducting data signals;
    read only memory means coupled to said address bus and segmented into at least two pages each having a like first plurality of memory locations for providing digital signals on said data bus corresponding to data stored in selected memory locations in response to application thereto of a page select signal unique to the page, the memory locations being selected in response to first address signals on said address bus, and
    first decoding means coupled to said address bus and to said data bus for providing the page select signal to a given page of said read only memory means in response to detection of a predetermined combination of first address signals on said address bus and a predetermined combination of data signals on said data bus;
    random access memory means coupled to selected ones of the signal lines of said address bus and to said data bus and having a second plurality of memory locations for either accepting digital signals from said data bus or providing digital signals to said data bus corresponding to data stored in selected memory locations in response to the application thereto of either a Write control signal or a Read control signal, respectively, and second decoding means coupled to the remaining ones of the signal lines of said address bus and to said random access memory means, including means for generating and providing a Write control signal to said random access memory means in response to detecting a first predetermined combination of address signals on the said remaining address lines and providing a Read control signal to said random access memory means in response to detection of a second predetermined combination of address signals on the said remaining address lines, and Write and Read control signals respectively designating whether information is to be written to or read from a memory location of said random access memory means addressed by an address signal on the selected ones of the address lines of said address bus.

2. A memory system according to claim 1, wherein said second decoding means includes means for addressing said random access memory means with twice as many different combinations of address signals on the said selected ones of the address lines of said address bus as there are memory locations in said random access memory means.

3. A memory system according to claim 1, wherein data signals communicated by one selected signal line of said data bus are coupled to said first decoding means.

4. A memory system according to claim 1, wherein said address bus has N signal lines, and wherein each of the pages of said read only memory means has a number of address locations substantially equal to the remainder resulting from the subtraction of the number of address locations in said random access memory means from the number $2^N$.

5. A memory system according to claim 2, wherein said address bus has N signal lines, wherein said random access memory means has $2^8$ memory locations and has eight signal lines of the said address bus coupled thereto, and wherein each of the pages of said read only memory means has a number of memory locations substantially equal to the remainder resulting from the subtraction of the number $2^9$ from the number $2^N$.

6. A memory system according to claim 1, wherein said first decoding means is normally disabled, and said second decoding means includes means operative in response to detection of predetermined addresses on the said remaining lines of said address bus for enabling and disabling said first decoding means.

7. For use in a digital system having a system address bus limited to N signal lines for conducting address signals, and a system data bus for conducting data signals, a digital memory system connectable to the said system address and data buses and having a read-only memory (ROM) capacity approximately M times the number of memory locations directly addressable with N address signals, where M is an integer having a value of two or more, and also having random access memory (RAM) capacity, the memory system comprising:

an address bus connectable to the system address bus for conducting address signals, a data bus connectable to the system data bus for conducting data signals, a digital memory coupled to said address bus and to said data bus and having approximately $2^{N+M}$ memory locations segmented so as to allocate a plurality, R, of the memory locations for utilization as RAM and to provide M pages of read-only memory (ROM) each having a like number of memory locations equal to $(2^N - R - M)$;

first decoding means, means coupling selected ones of the N signal lines of said address bus to said first decoding means and coupling the balance of the N signal lines to the address circuit of each of the memory locations allocated for RAM, said first decoding means including means for generating and applying to the RAM memory locations one or the other of first and second control signals to respectively designate whether data information is to be written to or read from a selected one of the said RAM memory locations addressed by an address signal on the said selected ones of said N signal lines;

second decoding means coupled to the address bus and to said data bus for detecting communication on said address bus of a predetermined number of said address signals and for detecting communication of data signals on selected lines of said data bus, including output means for providing one of M page select signals in response to detection of communication of the combination of a corresponding one of said predetermined address signals on the address bus and detection of communication of data signals on corresponding ones of selected data lines, and means coupling the output means of said second decoding means to the memory address circuit of each of the M pages of ROM for communicating the page select signals thereto, the memory address circuit being operable to select a one of the memory locations designated by the combination of address signals conducted on the address bus in the ROM page designated by the page select signal.

8. For a digital system including a system address bus having a limited number of signal lines for conducting address signals, and a system data bus, a memory system having both read only and random access memory capability, the memory system comprising:

a memory means having a plurality, P, of addressable memory locations segmented so as to set aside a selected number, R, of the memory locations for utilization as random access memory (RAM) and to provide a desired number, M, of pages of read-only memory (ROM) each of which has the same number of memory locations, which number is equal to $(P - R - M)$, where M is an integer having a value of two or more, an address bus connectable to the system address bus and coupled to said memory means for conducting address signals, a data bus connectable to the system data bus and coupled to said memory means for conducting data signals, first decoding logic means coupled to said address bus and to said data bus for detecting communication of predetermined ones of said address signals and at least one selected data signal, including means for generating one of M page select signals selected in response to detection of the combination of a corresponding one of said predetermined address signals and at least one selected data signal, means coupling selected ones of the signal lines of said address bus to the RAM memory locations for communication thereto of predetermined ones of said address signals to designate a one of the plurality of RAM memory locations to which data is to be written or read from, and second decoding means coupled to those signal lines of the address bus not coupled to the RAM memory locations for detecting communication of predetermined other ones of said address signals, including means for generating and applying to said RAM memory locations either a Read or a Write control signal to respectively designate whether information is to be written to or read from the addressed one of the RAM memory locations.

* * * * *